United States Patent
Duan et al.

[11] Patent Number: 6,028,564
[45] Date of Patent: *Feb. 22, 2000

[54] WIRE ANTENNA WITH OPTIMIZED IMPEDANCE FOR CONNECTING TO A CIRCUIT

[75] Inventors: Dah-Weih Duan, Peekskill; Daniel Joseph Friedman, Tarrytown; Harley Kent Heinrich, Brewster, all of N.Y.

[73] Assignee: Intermec IP Corp., Woodland Hills, Calif.

[ * ] Notice: This patent is subject to a terminal disclaimer.

[21] Appl. No.: 08/790,640

[22] Filed: Jan. 29, 1997

[51] Int. Cl.[7] .................................................. H01Q 19/10
[52] U.S. Cl. ......................... 343/818; 343/802; 340/572.7
[58] Field of Search .................................... 343/818, 815, 343/813, 817, 831, 802; 342/42; 340/572.7, 572.1, 572.2, 572.3, 572.4, 572.5, 572.6

[56] References Cited

U.S. PATENT DOCUMENTS

| Re. 24,413 | 1/1958 | Weiss ....................................... 343/818 |
| 4,604,628 | 8/1986 | Cox .......................................... 343/818 |
| 4,812,855 | 3/1989 | Coe et al. ................................ 343/818 |
| 5,489,914 | 2/1996 | Breed ....................................... 343/818 |
| 5,528,222 | 6/1996 | Moskowitz et al. ..................... 340/572 |

OTHER PUBLICATIONS

Communications Components, GaAs & silicon products Designer's Catalog, RF Components for RF/ID and RF Tags, Hewlett–Packard Co. 5091–4574E, pp. 2–16 to 2–17, Jan. 1993.

Antennas, 2nd Edition, John D. Kraus, "Arrays of Dipoles and of Apertures", McGraw–Hill, Inc. pp. 453–461.

The ARRL Antenna Book, The American Radio Relay League, Ch 8, 11 & 24, 1988.

Antenna Theory Analysis and Design, Constantine A. Balanis, Harper & Row Pub., pp. 496–501, 1982.

*Primary Examiner*—Don Wong
*Assistant Examiner*—Jennifer H. Malos
*Attorney, Agent, or Firm*—Louis J. Percello; James W. Wiegand

[57] ABSTRACT

An antenna used as a voltage and power source is designed to operate with arbitrary load, or front end. The antenna has one or more (number of) loading bars that are placed adjacent to the elements of the antenna at a spacing distance. The real part of the antenna input impedance is changed by adjusting the loading bar length, width, and/or spacing distance and/or the number of loading bars. These changes are implemented to reduce the real part of the antenna input impedance to make it small enough to develop an adequate voltage, Vp, to operated the front end and connected circuitry. In a preferred embodiment, the real part of the antenna input impedance is reduced to the point at which Vp no longer increases. One or more stubs is added to one or more of the antenna elements. The stubs act as two-conductor transmission line and is terminated either in a short-circuit or open-circuit. The short-circuit stubs act as a lumped inductor. The open-circuit stub acts as a lumped capacitor. The magnitude of these lumped capacitors and inductors (reactances) is affected by a stub length, a stub conductor width, and a stub spacing. Zero or more short-circuit stubs and zero or more open-circuit stubs are added to one or more of the antenna elements to change the reactive (imaginary) part of the antenna input impedance. In a preferred embodiment, the reactive part is changed to be equal to the negative magnitude of the reactive part of the front end input impedance. For a given real part of the antenna impedance, Ra, this approach maximizes both the DC voltage generated from the input and maximizes the power transferred between the antenna and the front end.

26 Claims, 7 Drawing Sheets

WIRE ANTENNA WITH OPTIMIZED IMPEDANCE FOR CONNECTING TO A CIRCUIT

FIELD OF THE INVENTION

This invention relates to the field of antenna design. More specifically, the invention relates to the field of optimizing the terminal voltage of an antenna attached to a circuit and the power transferred from an electromagnetic field to the circuit through the antenna, especially when the antenna is used in radio frequency tags.

BACKGROUND OF THE INVENTION

Figure 1:
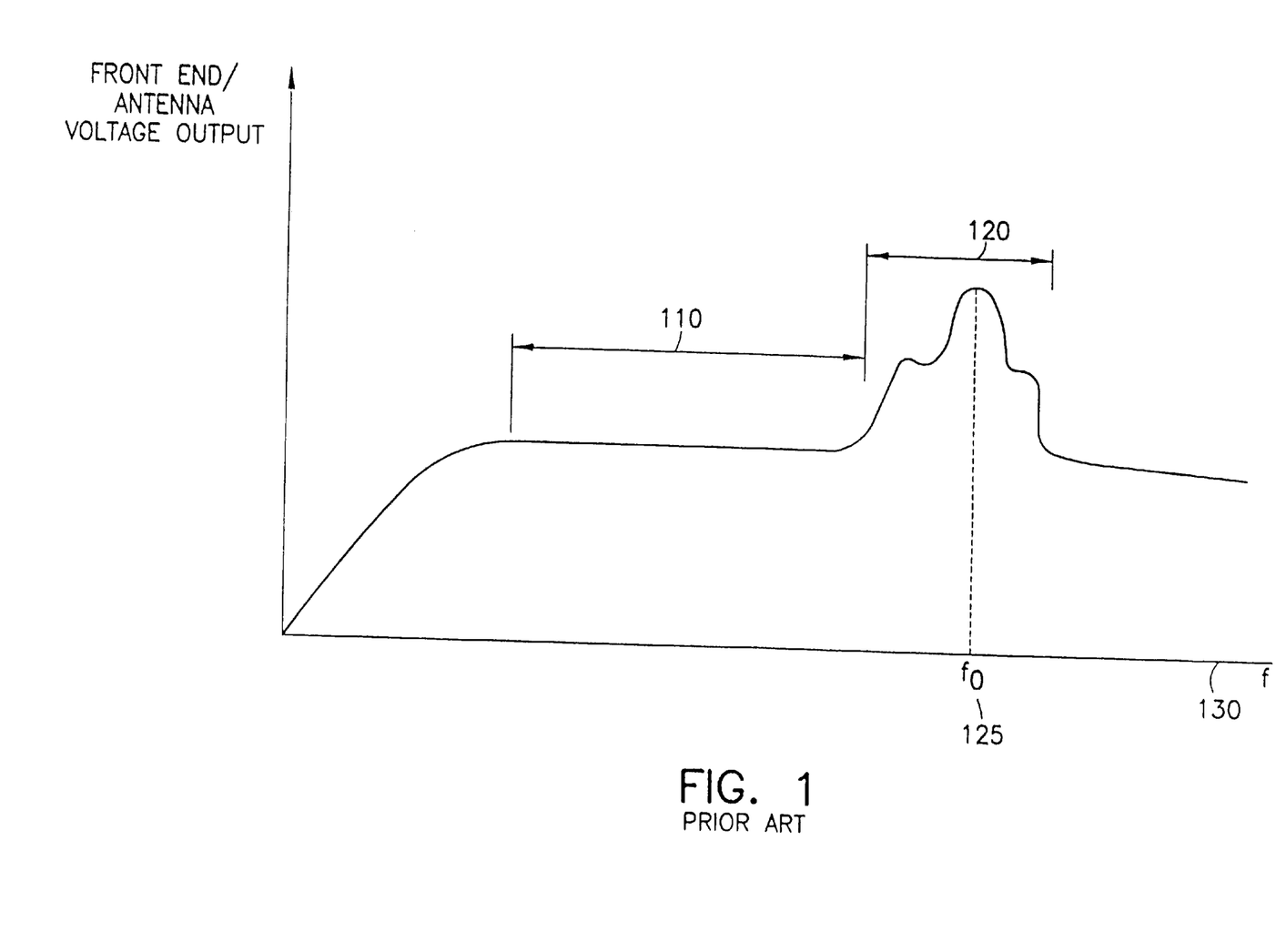
FIG. 1 is a graph showing a prior art representation of the frequency response of a prior art antenna/front end combination.

FIG. 1 is a graph of the output voltage of a typical antenna and front end circuit. In this common configuration, the antenna produces a voltage when excited by an electromagnetic field. This voltage is commonly called the open-circuit voltage across the antenna terminals. When the antenna terminals are connected to a front end circuit, power is transferred from the electromagnetic field through the antenna and into the front end circuits (front end). Front ends are generally known in the art and are used to convert (or down convert) the AC electromagnetic field into an intermediate frequency (IF) or direct current (DC) frequency.

Front end and antenna combinations have various designs depending on the application that the design is to perform. To illustrate this, FIG. 1 shows the voltage output of a front end and antenna combination versus frequency of the electromagnetic field. This voltage output has two regions: 1. a flat region 110 over a wide range of frequencies that produces a relatively low voltage output, and 2. a resonant region or bandwidth 120 centered about a resonant frequency 125 where the antenna produces a relatively large voltage over a smaller frequency range.

In some applications, e.g., field sensors, the antenna/front end combination is designed to disturb an electromagnetic field as little as possible. A field sensor measures the strength of an electromagnetic field and typically uses small antennas that operate over the wide frequency band 110, i.e., not around a resonant frequency 125 of the field sensor antenna. Over the range of frequencies 110, the front end is tuned so that it is out of resonance with the antenna. Therefore, there is a minimum of power taken by the combination, i.e., there is a minimum of power transferred from the antenna to the front end. Another way of stating this is that the antenna is loaded with a mismatched load (front end) that limits how much the electromagnetic field can excite the antenna. In this type of application, the combination is equally sensitive over a wide frequency range 110 and draws a minimum amount of power from the field, i.e., the sensor perturbs the field a minimum amount. In these applications, the antenna resonant frequency is chosen to be well outside the operation frequency range 110 and the front end is designed so that the combination does not resonate in the operation frequency range 110.

In other applications, antennas operate over the bandwidth 120 to receive/transmit signals over as wide a bandwidth as required. Generally, the bandwidth 120 of the antenna is relatively narrow but is widened in some cases, e.g., in television, radio, and some radar systems, to transmit/receive over a large number of channels or over a wide continuous spectrum. In other applications, e.g., those where a narrow bandwidth is required by law, antenna designers narrow the bandwidth 120 as needed to comply with the requirements. In these applications, the front end is designed to resonate with the antenna over the operation frequency range 120 so that the maximum amount of power is transferred between the antenna (and hence the electromagnetic field) and the front end (and hence any circuitry attached to the front end). In many embodiments of this type, the front end is variably tunable over a plurality of frequencies 125 so that the operation frequency range 120 varies over the frequency scale 130.

In the particular field of radio frequency identification (RFID) tags, especially passive RFID tags, antennas connected to the front end and the rest of the RFID circuit need to produce a front end output voltage that is above a threshold voltage, in order to power the RFID circuit. This is typically accomplished by trying to match the antenna impedance to that of the front end of the RFID circuit (e.g. a chip) at the resonance frequency 125. These front end circuits typically use diode and capacitor circuits (the front end) that rectify the radio frequency (RF) carrier component of the modulated electromagnetic field, that excites the antenna, leaving the modulated signal (envelope) at the output of the front end.

STATEMENT OF PROBLEMS WITH THE PRIOR ART

In general radio and TV applications, some prior art uses directors and/or reflectors to match the antenna impedance to a transmission line. However, the major effect of this solution is to give the antenna a more directional radiation pattern. However, since directors/reflectors typically are spaced at a large fraction of the resonant wavelength (e.g. 0.4 lambda, the carrier frequency wavelength), this solution requires large amounts of space in the antenna circuit package.

In RFID applications, the antenna/front end combination has to produce a minimum output voltage to power the chip and to provide a sufficient power collected from the electromagnetic field to provide current to the RFID circuit. If the voltage and/or power requirements of the RFID circuit are not fulfilled, the circuit will not operate. If the antenna/front end combination is not optimal, it will have a limited range (distance) over which it can communicate.

In order to optimize the voltage and/or power produced for the RFID circuit, the prior art attempts to match the antenna and front end impedances in a variety of ways. For example, the prior art uses impedance matching circuits using discrete components, e.g., inductor/capacitor networks. Also, the impedance matching circuit can comprise distributed elements such as microstrip structures. These alternatives add cost and size to the RFID circuit package.

Some of these alternatives in RFID applications are complicated and expensive to manufacture. Chip manufacturing processes are expensive to design and implement. Therefore, it is very difficult to modify front ends that are resident on the RFID chip for a given antenna. Hence, the prior art antenna/front end combinations can not be easily modified to provide an optimal power and voltage to the RFID circuit.

OBJECTS OF THE INVENTION

An object of this invention is an improved antenna apparatus.

An object of this invention is an improved antenna apparatus, used in combination with a radio frequency front end, that can be tuned to produce an optimal voltage output and power transfer.

An object of this invention is an improved antenna apparatus, used in combination with a radio frequency front end, that can be tuned to produce an optimal voltage output and power transfer with a minimal dimensional constraints on the antenna.

An object of this invention is an improved antenna apparatus, used in combination with a radio frequency front end, that can be tuned to produce an optimal voltage and power transfer without using additional discrete components in the front end.

SUMMARY OF THE INVENTION

This invention is an antenna used as a voltage and power source that is designed to operate with arbitrary load, or front end. The invention is particularly useful where it is difficult and/or costly to change the load (front end) design, e.g., in the field of communicating with RFID circuits.

The antenna, preferably a dipole antenna, has one or more (number of) loading bars that are placed adjacent to the elements of the antenna at a spacing distance. The real part of the antenna input impedance is changed by adjusting the loading bar length, width, and/or spacing distance and/or the number of loading bars. These changes are implemented to reduce the real part of the antenna input impedance to make it small enough to develop an adequate voltage, Vp, to operate the front end and connected circuitry. In a preferred embodiment, the real part of the antenna input impedance is reduced to the point at which Vp no longer increases.

In an alternative preferred embodiment, one or more stubs is added to one or more of the antenna elements. The stubs act as two-conductor transmission line that is terminated either in a short-circuit or open-circuit. The short-circuited stub(s) acts as a lumped inductor (capacitor) when the length of the transmission line is within odd (even) multiples of one quarter "guided wavelength" of the transmission line. (The guided wavelength has a known relation to the wavelength to which the antenna is tuned.) The open-circuited stub(s) acts as a lumped capacitor (inductor) when the length of the transmission line is within odd (even) multiples of one quarter of the guided wavelength. The magnitude of these lumped capacitors and inductors (reactances) is affected not only by the material surrounding the stub, but also is affected by a stub length, a stub conductor width, and a stub conductor spacing. Zero or more short-circuit stubs and zero or more open-circuit stubs are added to one or more of the antenna elements to change the reactive (imaginary) part of the antenna input impedance. In a preferred embodiment, the reactive part of the antenna input impedance is changed to equal the negative magnitude of the reactive part of the front end input impedance. This gives the maximum voltage, VDC, for a given real part (Ra) of the antenna input impedance and the maximum power transfer between the antenna and the front end.

Note that in this invention, the loading bar changes vary the real part of the antenna input impedance. Also, with the loading bar the length of the antenna can change (increase or decrease) to change the reactive part of the antenna impedance while changing the real part of the antenna impedance only a minimal amount. Further, adding the stubs changes the reactive part of the antenna input impedance while the real part of the antenna input impedance changes only a minimal amount. Therefore, the invention essentially decouples the tuning of the real part and reactive part of the antenna input impedance and permits effective antenna design to optimize the combination of the antenna and any arbitrary front end (impedance).

BRIEF DESCRIPTION OF THE DRAWINGS

FIG. 2, comprising FIGS. 2A and 2B, is a block diagram of a radio frequency transmitter (FIG. 2A) communicating an RF signal to a receiver (FIG. 2B).

FIG. 3, comprising

FIG. 5, comprising

FIG. 6, comprising

FIG. 7, comprising

DETAILED DESCRIPTION OF THE INVENTION

Figure 2:
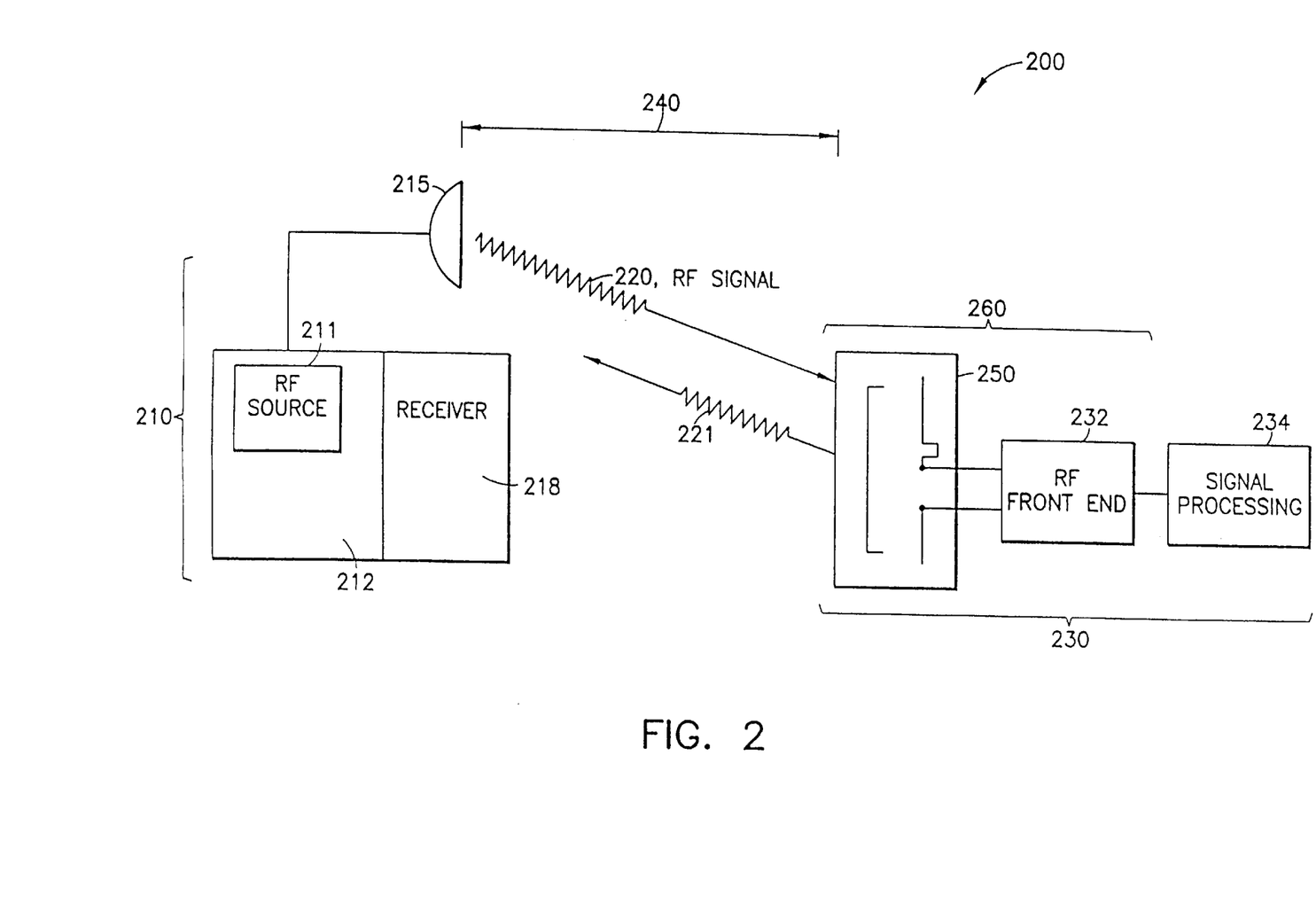

FIG. 2 is a block diagram showing a system 200 with a transmitter or base station 210 communicating an RF signal 220 to any general receiver 230, specifically an RFID tag 230.

Block 210 is any radio frequency transmitter/transponder that is well known in the art. The transmitter includes an RF source 211 and RF amplifier 212 that sends RF power to the transmitter antenna 215. The transmitter 210 can also have an optional receiver section 218 for two way communications with the receiver/tag 230. The transmitter 210 transmits an RF signal 220 with a transmitter carrier frequency. The transmitter carrier also has a transmitting carrier frequency bandwidth referred to as a transmitting bandwidth. The transmitting bandwidth will be wide enough to transmit data at a rate selected by the system designer. Systems like this are well known in the art. See for example U.S. patent application Ser. No. 4,656,463 to Anders et al. entitled "LIMIS Systems, Devices and Methods", issued on Apr. 7, 1987 which is herein incorporated by reference in its entirety.

FIG. 2B is a block diagram of a receiver 230, specifically an RFID tag, comprising the present novel antenna 250 (see FIG. 4), an RF processing section, i.e., the front end, 232 and a signal processing section 234. The antenna 250 and front end 232 make up the antenna/front end combination 260.

The front end 232 can be any known front end design used with an antenna. Typically, in RFID applications using passive tags, the front end 232 converts the electromagnetic field 220 into a direct current (DC) voltage that supplies the power required to operate the signal processing component 234 of the RFID circuit (232 and 234 inclusive) and extracts the envelop of the modulated signal from the electromagnetic field 220. Examples of front ends are well known. See for example the Hewlett Packard "Communications Components GaAs & Silicon Products Designer's Catalog" (for instance pages 2–15) which is herein incorporated by reference in its entirety. A preferred front end is shown in FIG. 3A.

The signal processing component 234 of the RFID circuit can be any known RFID circuit. Examples of this processing component are given in U.S. patent application Ser. No. 08/694,606, entitled "Radio Frequency Identification System with Write Broadcast Capability" to Heinrich et al. filed on Aug. 9, 1996, and U.S. patent application Ser. No. 08/681,741, entitled "Radio Frequency Identification Transponder with Electronic Circuit Enabling/Disabling Capability", filed Jul. 29, 1996, which are both herein incorporated by reference in its entirety.

Figure 3A:
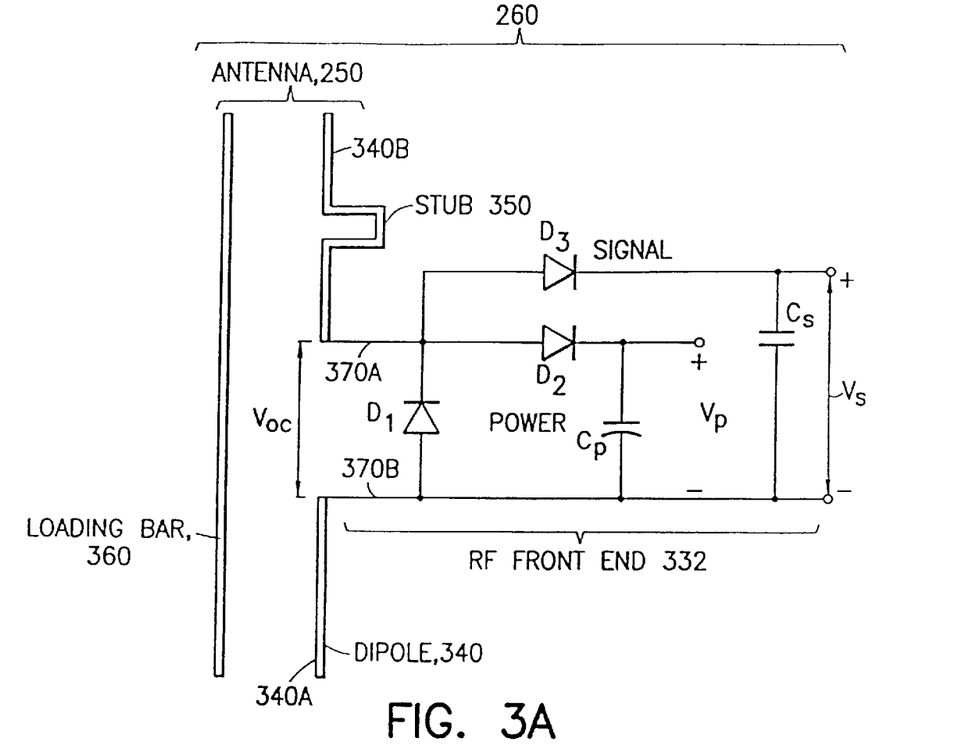
FIGS. 3A and 3B, is a block diagram of a preferred antenna and front end combination (FIG. 3A) and a general equivalent circuit of this combination (FIG. 3B).

FIG. 3A is a block diagram showing a preferred front end 332 and the novel antenna 250.

The antenna comprises a dipole antenna 340 with one or more optional stubs 350 on one or both of its elements (340A and 340B). One or more loading bars 360 are placed close and parallel to the dipole 340 elements (340A, 340B). Alternative embodiments of the antenna 250 are described below.

The front end 332 is electrically connected to the antenna 250. In this preferred embodiment, the front end 332 comprises diodes D1, D2, and D3, and capacitors Cp and Cs. In a preferred embodiment, the diodes D1, D2, and D3 have a low series resistance and a low parasitic capacitance. Preferably, the series resistance is less than 30 ohms and the parasitic capacitance is less than 500 femto farads. Typically, these diodes are Schottky diodes that are produced by known semiconductor processing techniques. The capacitors, Cp and Cs, are also produced by known semiconductor processing techniques. Alternatively, capacitors, Cp and Cs, can be discrete devices.

Diodes D1 and D2 and capacitor Cp form a voltage doubler circuit that rectifies the electromagnetic field 220 into a DC voltage that stores energy in the capacitor Cp used to power the signal processing component 234. Therefore, a voltage, Vp, is developed across capacitor Cp. In a preferred embodiment, diodes D1 and D2 produce the voltage Vp that is equal to or less than 2 times the voltage, Voc, produced across the antenna terminals (370A, 370B), where Voc is the open-circuit voltage produced at the antenna terminals (370A, 370B) from the electromagnetic field 220. Note that Voc is an AC voltage whereas Vp is a DC voltage. The magnitude of Vp is equal to or less than the peak to peak value of Voc. See U.S. patent application Ser. No. 08/733,684 entitled "DIODE RECEIVER FOR RADIO FREQUENCY TRANSPONDER" to Friedman et al. filed on Oct. 17, 1996 and U.S. patent application Ser. No. 08/521,898 entitled "DIODE MODULATOR FOR RADIO FREQUENCY TRANSPONDER" to Friedman et al. filed on Aug. 31, 1995 which are herein incorporated by reference in their entirety.

The capacitor, Cp, is large enough to be treated as a short-circuit at the carrier frequency of the electromagnetic field 220 and large enough to store enough energy to power the signal processing component 234. In a preferred embodiment, the value of Cp is between 10 pf and 500 pf for a 2.44 gigaHertz (GHz) carrier frequency.

Diodes D1 and D3 and capacitor Cs form a second voltage doubler circuit that also rectifies the electromagnetic field 220 into a DC voltage that stores energy in the capacitor Cs used to provide a demodulated signal to the signal processing component 234. Therefore, a DC voltage, Vs, is developed across capacitor Cs. In a preferred embodiment, the DC voltage or low frequency AC voltage, Vs, is the signal voltage that is equal to or less than 2 times the amplitude of the AC voltage, Voc, produced across the antenna terminals (370A, 370B), where Voc is the open-circuit voltage produced from the electromagnetic field 220. The capacitor, Cs, is large enough to be treated as a short-circuit at the carrier frequency of the electromagnetic field 220 but should be small enough so that signal is not smoothed to the point where it can not be used by the signal processing component 234. In a preferred embodiment, the value of Cs is between 1.5 pf and 25 pf for a carrier frequency of 2.44 gigaHertz and a signal frequency of 38.4 kiloHertz. More preferably the range of Cs is between 1.5 pf and 10 pf. The carrier frequency determines the lower boundary and the signal frequency determines the upper boundary for the value of Cs.

Figure 3B:
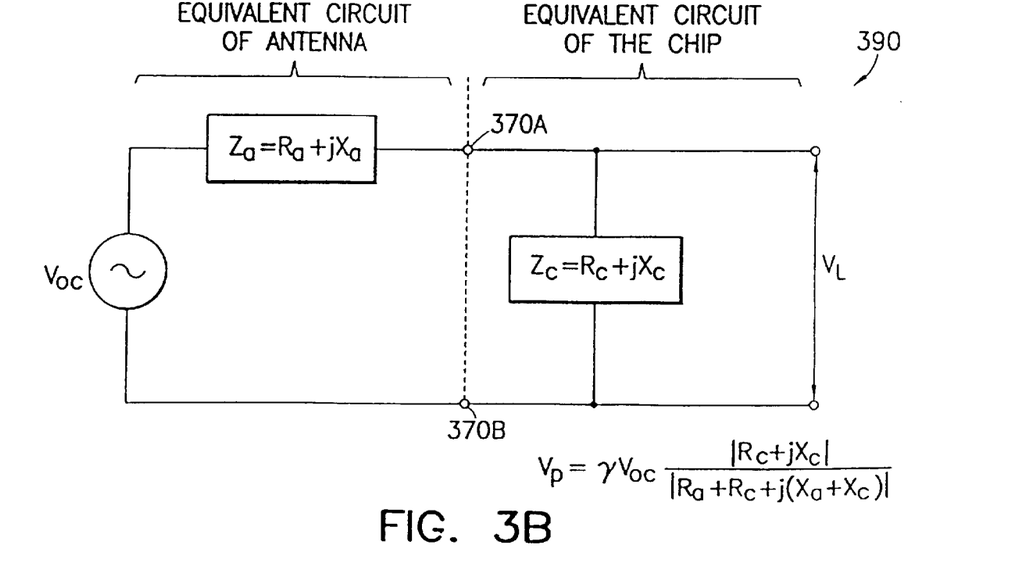

FIG. 3B is a circuit diagram of a circuit 390 that models the combination 260 of the antenna 250 and the front end 332. The circuit comprises a voltage, Voc; an antenna impedance, Za; and a front end impedance, Zc. The voltage, Voc, and the impedance, Za, represent the equivalent circuit of the antenna 250, while the impedance, Zc, represents the equivalent circuit of the front end. Note that the impedance, Za (Zc), has a real part Ra (Rc) and an imaginary part Xa (Xc), respectively. The impedance Za, and therefore its real, Ra, and imaginary, Xa, parts, are uniquely determined by the components (340, 350, 360) of the antenna 250 and their respective physical dimensions.

The dimensions of the antenna elements (340A, 340B), the stub 350, and the loading bar(s) 360 are chosen so that the DC voltage developed in the front end, e.g. Vp and Vs, and the power transferred to the front end, e.g. stored in capacitors Cp and Cs, is optimum for an arbitrarily selected front end 232. In one preferred embodiment, the optimum voltage is the voltage, Vp, necessary to power the signal processing component 234 at a given distance from the base station antenna 215 and the optimum power is the maximum possible power transferred under this voltage condition. This is accomplished, for any arbitrary front end, while maintaining the resonant frequency of the antenna and minimizing the area and volume that the antenna 250 occupies. The invention further permits the antenna 250 to be designed for a narrow bandwidth.

Note that the problem solved by this invention is how to design a power source, i.e., an antenna 250 given an arbitrary load 232. This problem arises in one instance where it is difficult and/or costly to change the load design, e.g., the design of the RFID circuit (including the front end 232) used with the antenna 250. This problem has not been recognized or addressed by the prior art, particularly in the field of RFID.

More specifically, the voltage provided to the load, the RFID circuit, e.g., either Vp or Vs, is given by $$VDC = \gamma Voc |Rc+jXc|/|Ra+Rc+j(Xa+Xc)| = \gamma VL$$

where $\gamma$ is the voltage multiplying factor, e.g., 2 for a front end with a voltage doubler, 4 for a quadrupler, etc. This equation neglects the "turn on" (offset) voltage of the diodes.

For a given load, i.e., impedance Zc, the voltage VDC is maximum when the imaginary part of the antenna impedance, Xa, and the imaginary part of the front end impedance, Xc, cancel, and the real part of the antenna impedance, Ra, is minimum, i.e., zero. However, in the preferred embodiment, the real part of the antenna impedance, Ra, can not be zero. This is because as Ra approaches zero, so does the open circuit voltage, Voc, generated by the antenna. Furthermore, as Ra approaches zero, the amount of energy back scattered from the antenna also approaches zero and, as a result, no data can be transmitted back to the base station 210. In addition, since the power transferred to the load is proportional to the square of Voc, the power available to the load (RFID circuit) falls as the square of Voc.

More specifically, the voltage, Voc, is determined by the following:

$$Voc = heff * Ei$$

where heff is the effective antenna height and Ei is the strength of the electromagnetic field at the location of the antenna. Note that Ei is related to the distance 240 that the antenna 250 is from the base station antenna 215. The effective height, heff, is uniquely determined by the geometry of the antenna 215. In one preferred embodiment, the loading bar 360 is added to the dipole 340 to reduce the real part of the antenna impedance, Ra. In this embodiment, one or more loading bars 360 are added to reduce Ra to a minimum value. However, this minimum value must be large enough to: 1. maintain Voc above a minimum input voltage, 2. maintain a minimum power to the load to provide the current required by the load, and 3. to provide enough back scattered 221 electromagnetic field to transmit information to the base station 210, if required. For example, by adding one loading bar to a dipole, Ra is reduced from about 73 ohms to about 15 ohms. By adding a second loading bar to the dipole, Ra is further reduced to less than 10 ohms.

The minimum voltage, Voc, is determined by the requirements to operate the arbitrarily selected load, e.g. RFID circuit (232,234), at a given distance 240 from the base station. Since Voc is the product of heff and Ei, heff must be maintained above a minimum level given the Ei (i.e., the distance and field 220 strength) and the voltage requirements of the load. For some CMOS processes, Vp must be above 1.5 volts to read data from an Electrically Erasable Programmable Read Only Memory an (EEPROM) and other Complementary Metal Oxide Semiconductor (CMOS) circuit, and typically between 3 and 3.3 volts to write to an EEPROM circuit. These voltages will be reduced in finer line-width processes.

Power is proportional to the square of Voc and if Voc drops too low, there will not be an adequate amount of current for the load. This requirement is determined by the minimum current requirements of the load. In a preferred embodiment, several micro amperes are required to read an EEPROM circuit and ten times that level of current is required to write to an EEPROM circuit. Therefore, the antenna must maintain the respective Voc described above while delivering these required currents.

The (optional) back scattering requirement is determined by the distance 240, the sensitivity of the base station receiver 218, the power transmitted, and back scattering cross section (a function of Ra) of the antenna, the gain of the base station antenna, and the gain of the tag antenna, as follows:

$$R = \left[ \frac{P_t G^2 \lambda^2}{(4\pi)^3 P_{\min}} \right]^{1/4} \sigma^{1/4}$$

where R is the maximum detection range (e.g. 240), $P_{min}$ is the minimum power required for the receiver 218 to detect the signal (determined by the sensitivity of the receiver 218), $P_t$ is the transmitted power transmitted by the RF source 211, G is the gain of the base station antenna 215, $\lambda$ is the wavelength of the RF signal 220, and $\sigma$ is the effective absorbing area of the antenna 250.

For example, if the ratio of $$\frac{P_t}{P_{\min}} = 10^{8.5},$$

G=4, $\mu$=0.12 meters, $\sigma$=0.13$\mu^2$=0.0019, $\sigma^{1/4}$=0.21, then the maximum detection range, R, becomes 2.9 meters. Yet further, if all the parameters are the same but $\sigma$ is reduced by 10 times, then R=1.6 meters.

Factoring in the above, in a preferred embodiment, Ra is in the range between 10 ohms and 73 ohms and more preferably in the range between 10 ohms and 25 ohms.

In an alternative preferred embodiment, the stub 350 is provided to adjust the imaginary part (reactance) of the antenna, Xa, to cancel the effect of the imaginary part of the load, Xc. Typically, since Xc is capacitive, the stub 350 adjusts Xa to be inductive with the same magnitude as Xc. Note that the length of the dipole elements (340A, 340B) can also be adjusted to achieve this cancellation. However, when the antenna length is changed in this way, the resonant frequency of the antenna also changes and the size of the antenna typically increases. Further, increasing the length of the antenna elements (340A, 340B) causes the real part of the antenna impedance, Ra, to increase rapidly and therefore reduce the voltage (and power) to the load.

Accordingly, by using the stub 350, the reactance of the antenna can be adjusted to cancel any arbitrary load reactance, Xc, without increasing the size of the antenna, without increasing the real part of the antenna impedance (therefore not reducing the voltage and power to the load), and without substantially changing the resonant frequency of the antenna. Furthermore, the effective height of the antenna 250, heff, can be maintained virtually unchanged, when the stub(s) 350 is (are) introduced.

Figure 4:
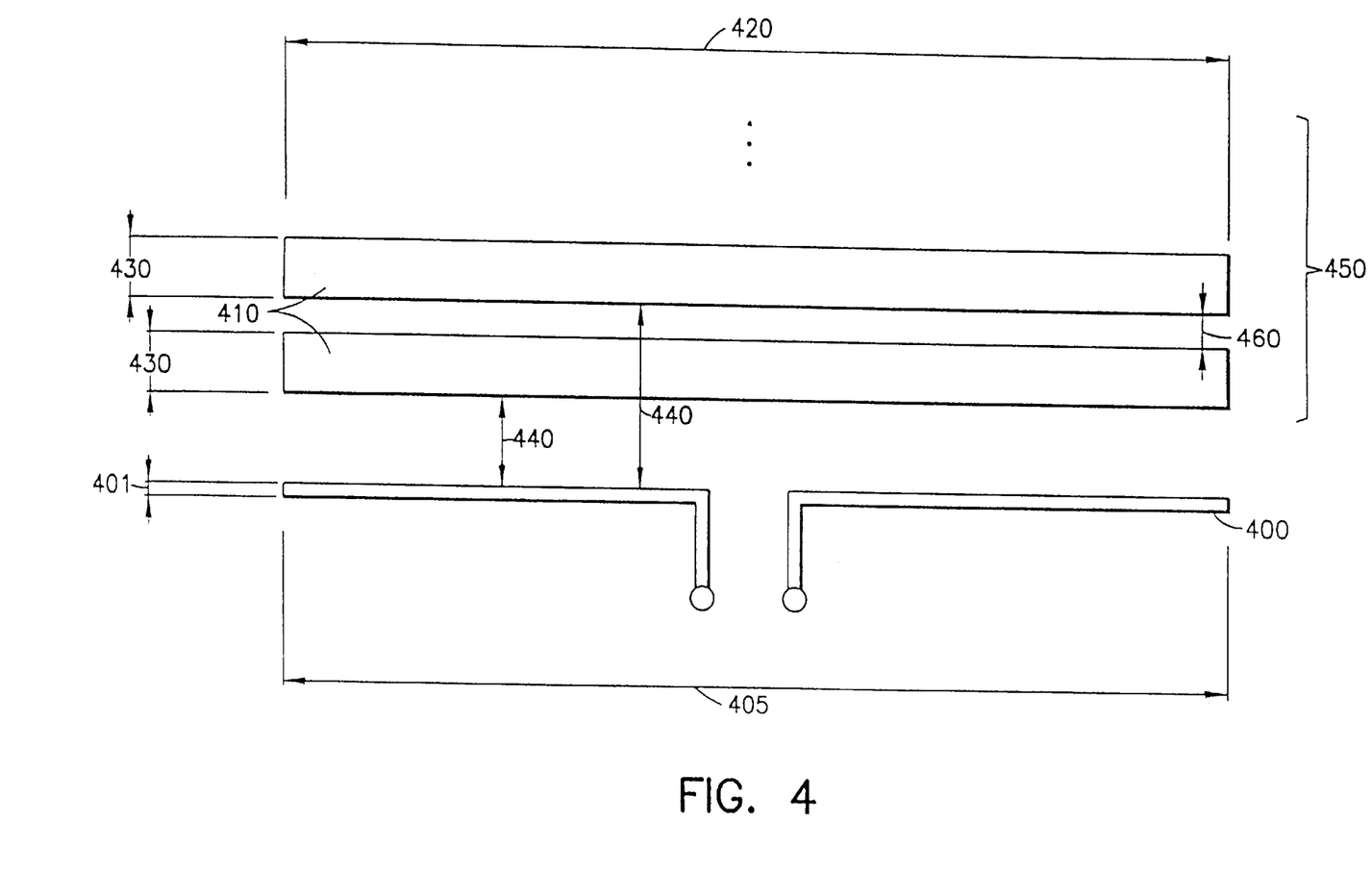
FIG. 4 is a block diagram showing one novel structure of the present antenna using one or more loading bars.

FIG. 4 is a block diagram of one preferred embodiment of the present receiving antenna 250, e.g. mounted on a substrate. The substrate can be any known substrate and the antenna any type of an conductive material, e.g. metal wires, printed metal on circuit (PC) boards, printed metal on flexible substrate, screen printed conductive ink, and punched (or etched) lead frame. One preferred method and apparatus that can be used with the design of this antenna is disclosed in U.S. patent application Ser. Nos. 08/621,784 entitled "Thin Radio Frequency Transponder with Leadframe Antenna Structure", filed on Mar. 25, 1996 to Brady et al. and 08/621/385 entitled "Method of Making Thin Radio Frequency Transponder" filed on Mar. 25, 1996 to Brady et al. which are herein incorporated by reference in their entirety.

FIG. 4 shows a dipole antenna 400 with a number 450 of (one or more) loading bars (360,410). Various geometric properties of the loading bar include: the length of a loading bar(s) 420, the width of a loading bar(s) 430, the distance 440 between a loading bar and the antenna 400, and the distance 460 between loading bars when there is more than one loading bar. Thickness of the conductive lamination, not shown, is not considered significant for these applications. Where the cross sections of the conductive lamination are of different non-rectangular shapes, known analysis can be used to determine an equivalent lamination with a rectangular cross section. Note that for most RFID applications, the thickness of the conductive lamination is a small percentage of the width of the antenna 401 or loading bars 410 and therefore, these cross sectional effects is of secondary importance.

Note that the antenna (250, 400) is shown as a dipolar antenna. However, the invention will also apply to other well known antenna types, e.g., folded dipole, loop antenna or their complements (slot antennas). (For examples of some antenna types, see U.S. patent application Ser. No. 08/303, 976 to Brady et al., titled "RADIO FREQUENCY IDENTIFICATION TAG", filed on Sep. 9, 1994, and U.S. Pat. No. 5,528,222 to Moskowitz et al. issued Jun. 18, 1996 which are both herein incorporated by reference in their entirety.) In the cases where the antenna is not a DC open-circuit, the front end must be designed to provide a DC isolation (e.g. inserting an appropriate capacitor in series with the antenna and its terminal 370 ). Complements of antennas are those antennas where the conductive portion is replaced by non conductive material and the non conductive portion is replaced by conductive material.

A number 450, i.e., one or more, loading bars 410 are placed adjacent (within a distance 440) to the antenna 400 so that, in combination, they act as a loading element on the antenna 400. A loading bar 410 is characterized by its length 420, width 430, and the distance 440 to the antenna 400.

The effect of loading bars 410 is to suppress (reduce) the real part of the antenna input impedance, Ra. This suppression is observed over a bandwidth. When the carrier frequency is beyond this bandwidth, the real part of the antenna input impedance, Ra, rises again, but at a slower rate compared to the antenna 400 with no loading bar 410. The presence of the loading bar 410 also affects the imaginary part of the antenna input impedance. However, the effect is minimal, and the imaginary part of the antenna input impedance still increases monotonically as frequency increases. Therefore, over the bandwidth, the Ra is suppressed without significantly affecting the imaginary part.

In general, the smaller the spacing 440 between the loading bars and the antenna 400, the more significant is the suppression of the real part of the antenna input impedance, Ra. In one embodiment, the spacing 440 is less than 25% of the the the wavelength of the operating frequency, i.e., the frequency 125 to which the antenna is tuned to resonate. In a more preferred embodiment, the spacing 440 is less than 10% of this wavelength, and in a still more preferred embodiment, the spacing 440 is less than 3% of this wavelength. Furthermore, the resonant frequency (the frequency at which the imaginary part of the antenna input impedance vanishes) decreases when the spacing 440 between the loading bar and a dipole antenna increases. The change in resonant frequency is also minor. For instance, the antenna can be retuned by changing the length of the antenna 400 but this change in length (on the order of a few per cent) will not cause the antenna 400 to occupy a much larger area.

In general, when the length of loading bars 420 is between zero and the length of the antenna 400, the suppression effect increases as the length 420 increases. (The length 420 here is the effective length, i.e., the length of the loading bar that is within the spacing distance 440 of the antenna and therefore has a stronger interaction with the antenna.) However, the effect is less significant when the length 420 becomes larger than the length 405 of the antenna 400. In a preferred embodiment, the length of loading bars 420 is chosen to be similar to or smaller than that of a dipole antenna, e.g. the length of the dipole, within a tolerance. Manufacturing considerations may also dictate the length 420.

In general, the effect of loading bars increases with the width 430 of loading bars, namely, the real part of the antenna input impedance is further suppressed. Empirical tests have shown that loading bar widths 430 of up to 30 times the width 401 of the antenna effectively suppress the real part, Ra. However, even a loading bar with the same width 430 as that of the antenna 401 will suppress Ra. For example, a single loading bar with a width 430 equal to the width of the antenna 401, a length 420 approximately equal to the length 405 of the antenna, and a spacing 440 of twice the antenna width 401, suppressed Ra from 73 ohms to 15 ohms. In this case increasing the width 430 of the loading bar further reduces Ra.

In general, the real part of the antenna input impedance is suppressed more with a larger number of loading bars 550. For example, using a second loading bar 410 with the same width 430 as the antenna's width 401 and a spacing 460 to the first loading bar the same as the spacing 440 between the first loading bar 410 and the antenna 400 suppressed the Ra from 15 ohms to 5 ohms. While the number of bars 450 depends on the application, two preferred numbers of bars 450 are: one or two. The smaller the number 450 of loading bars 410, the less area the antenna occupies and the less asymmetry is introduced into the antenna radiation pattern.

In a preferred embodiment, the spacing 460 between the loading bars 410 is chosen to be similar to that between loading bars and the antenna 440, i.e., less than 25% of the wavelength. Note that the further that the next loading bar is from the antenna, the less the effect on Ra of this loading bar. Also, this loading bar spacing 460 can be varied to affect the antenna radiation pattern.

The length of loading bars 420, the width of loading bars 430, the spacing to a dipole antenna 440, and the number of loading bars 450 can be adjusted to obtain the desired real part of the antenna input impedance without significantly changing the imaginary part of the antenna input impedance, Xa, and the resonant frequency of the antenna 400.

FIG. 5 is a block diagram that shows alternative embodiments of the loading bars 410. As mentioned above, the loading bars 410 are adjacent to the antenna 400. "Adjacent" means that at least some part (i.e., the effective part) of the loading bar is within a distance 440 of some part of the antenna 400, where the distance 440 is a small percentage (preferably under 25%, more preferably under 10%, and still more preferably under 3%) of the wavelength of the resonant and/or operating frequency.

Figure 5A:
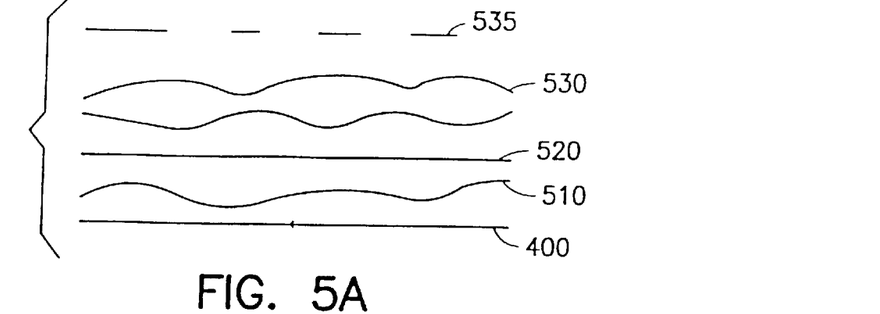
FIGS. 5A–5D, shows variations of the loading bar structures.
Figure 5B:
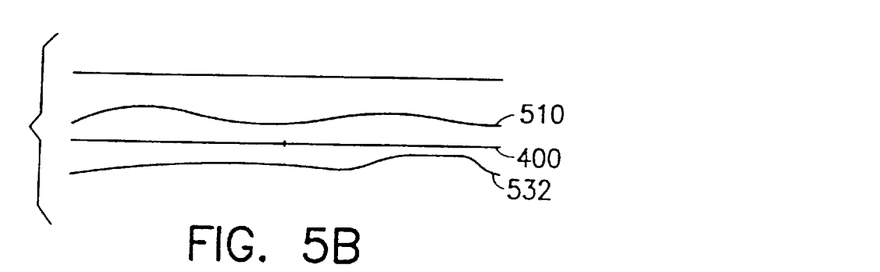
Figure 5C:
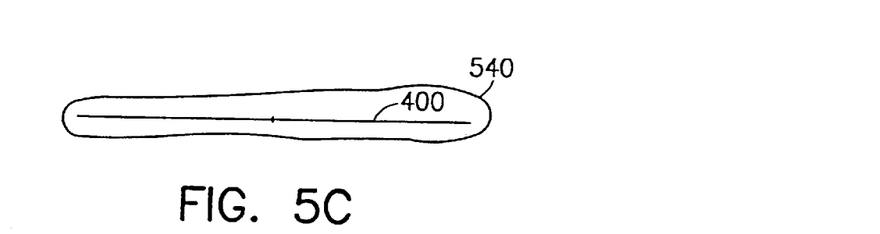
Figure 5D:
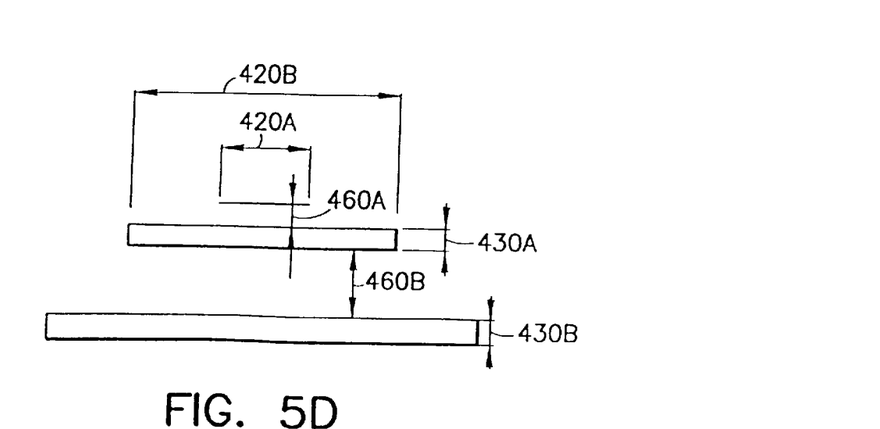

FIG. 5A shows loading bars 410 of various shapes. Note that any combination of these shapes is possible. Loading bar 510 is a non-linear loading bar, e.g. having one or more curves. Loading bar 520 is linear. Loading bar 530 has one or more locations with a varying width 430. Loading bar 535 is made of two or more sections that are not electrically connected to one another. Note that at one or more points along the loading bars 410, e.g., the ends, two or more loading bars can be electrically connected. In some embodiments, this might be done to enhance the mechanical strength of the antenna 400. FIG. 5B shows loading bars (510, 532) on either or both sides of a dipole antenna 400. FIG. 5C shows a loading bar 540 that wraps around the antenna 400. FIG. 5D shows loading bars with various lengths (420 A,B), various spacing between the loading bars (460 A,B), and various widths of loading bars (430 A,B).

Essentially, the loading effect of the loading bars is caused by the accumulated effect of the electromagnetic coupling between any given point on the loading bar 410 to any given point on the antenna 400 as well as the electromagnetic coupling among the loading bars. This coupling is inversely proportional to the distance between these two points. Therefore, there are the following rules of thumb:

1. the closer 440 the loading bar is to the antenna, the greater the suppression of Ra.
2. the more portions (effective length) of the loading bar that are close 440 to antenna, the greater the suppression of Ra.

3. the larger the area of the loading bar, i.e., determined by the length 420 and the width 430, the greater the suppression of Ra. Note that area is also dependent on the shape of the loading bar. The area is also determined by the number 450 of loading bars.

Figure 6A:
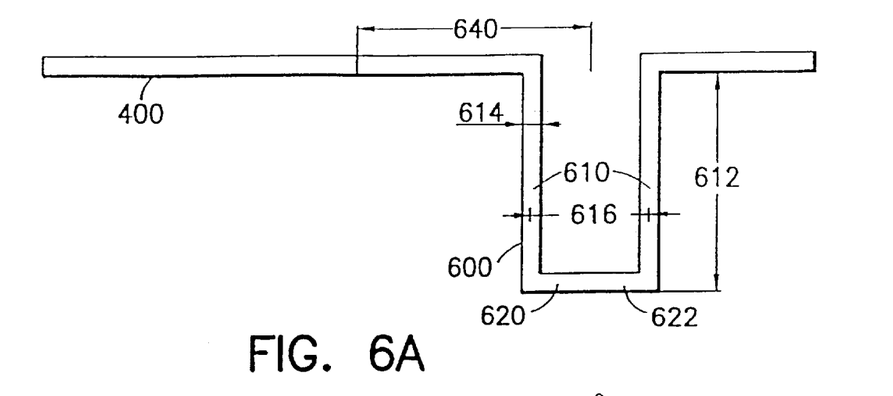
FIGS. 6A and 6B, is a block diagram showing an short-circuit (FIG. 6A) and an open-circuit stub (FIG. 6B) structure.
Figure 6B:
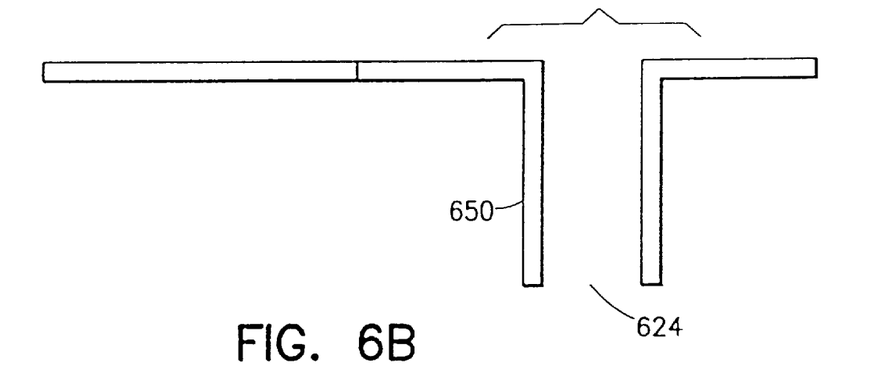

FIG. 6A is a block diagram of a closed- or short-circuited tuning stub 600 that is part of one or more of the elements of the antenna 400. FIG. 6B shows an alternative tuning stub, the short- or open-circuited tuning stub 650. Closed tuning stubs 600 and open tuning stubs 650 add reactance to the antenna and therefore, can be treated as a lumped reactive element (inductor or capacitor).

Tuning stubs are further disclosed and claimed in U.S. patent application Ser. No. ber XXX, entitled "A WIRE ANTENNA WITH STUBS TO OPTIMIZE IMPEDANCE FOR CONNECTING TO A CIRCUIT" filed on the same day as this disclosure.

A tuning stub may be treated as a transmission line comprising two transmission-line conductors 610 and a termination 620. A tuning stub can be treated as a lumped, reactive circuit element, namely, an inductor or a capacitor. The electrical property of the tuning stub is determined by its length 612, width of the conductors 614, spacing of the conductors 616, and a termination 620. The termination 620 could be a short-circuited termination 622, or an open-circuited termination 624.

For a short-circuited termination 622, the impedance of a stub is determined by $$Zs = j*Z0*tan(beta*1) \quad (1)$$

where j is the square root of −1, Z0 is the characteristic impedance of the stub transmission line, tan is the tangent trigonometrical function, beta is the phase constant of the stub transmission line, and l is the length of the stub 612. The characteristic impedance of the stub transmission line, Z0, is determined by $$Z0 = 120*log(4*s/w) \quad (2)$$

where log is the natural logarithm function, s is the center-to-center spacing of the transmission line conductors 616, and w is the width of the transmission line conductors 614.

The phase constant of the stub transmission line, beta, is determined by $$beta = 2*pi/lambda\_g \quad (3)$$

where lambda_g is the guided wavelength that is related to the medium that surrounds the antenna. The guided wavelength can be determined by well known techniques. Pi is approximately equal to 3.1416.

For an open-circuited termination 624, the impedance of a stub is given by $$Zo = -j*Z0*cot(beta*1) \quad (4)$$

where j is the square root of −1, Z0 is the characteristic impedance of the stub transmission line, cot is the cotangent trigonometrical function, beta is the phase constant of the stub transmission line, and 1 is the length of the stub 612.

Using equations (1) and (4), one may design the tuning stub with any desired impedance.

By examining the equations above, it is seen that increasing the length 612 increases the inductance (capacitance) for a short (open) circuited stub only when the length 612 is between 2 n times a quarter of the guided wavelength and 2 n+1 times a quarter of the guided wavelength (where n=0, 1, 2, 3, etc.). However, if the length 612, is between 2 n+1 and 2 n+2 times a quarter wavelength of the operating/resonant frequency, then increasing the length 612 increases the inductance (capacitance) for an open (short) circuited stub.

In a preferred embodiment, the length of a tuning stub 612 is often constrained to be shorter than a quarter of a guided wavelength in the transmission line. In this situation, the imaginary part of the impedance of a short-circuited stub is positive according to equation (1), making the stub behave like an inductor. Similarly, the imaginary part of the impedance of an open-circuited stub is negative according to equation (4), making the stub behave like a capacitor. Notice that if the length of the stub 612 is between a quarter wavelength and a half wave length, a short-circuited stub becomes capacitive, and an open-circuited stub becomes inductive. The reactance of the tuning stub changes sign when the length of the stub changes into the next quarter wavelength.

For convenience in discussion below, it is assumed that the stub lengths 612 are less than or equal to a quarter wave length of the operating/resonance frequency. However, this description applies equally to other quarter wavelength multiples of length as described above.

The following rules apply in the design of stubs:

1. The longer the stub, the larger the reactance.
2. The larger the spacing (116)-to-width (614) ratio, s/w, the larger the reactance.
3. The length 612, spacing 616, and termination of the stub (620, 624), and the substrate material can be chosen to produce the desired reactance value. (The substrate material changes the effective dielectric constant that determines the characteristic impedance of the transmission line 610.)
4. The tuning stub basically behaves like a lumped circuit element. It may be used to replace a lumped inductor, for example, to load an antenna and to produce the desired antenna input impedance without significantly changing Ra.
5. A tuning stub functions independently of the loading bars. While loading bars mainly change the real part of the antenna input, Ra, the tuning stubs mainly change the reactive part of the antenna input impedance.

Figure 7A:
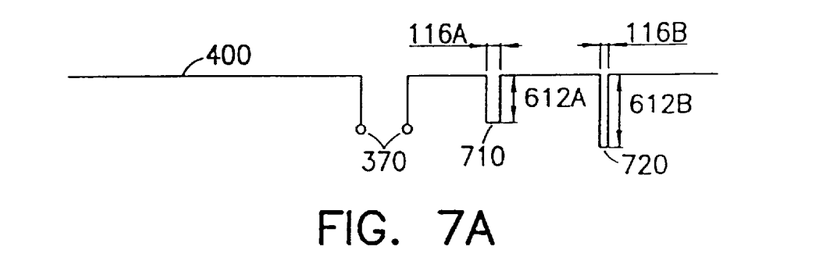
FIGS. 7A and 7B, shows variations of the stub structures.
Figure 7B:
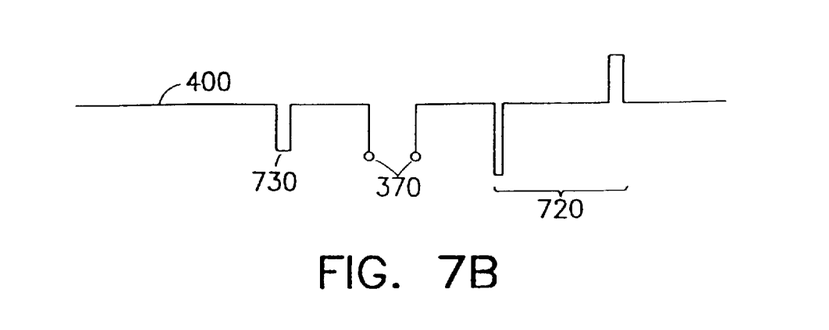

FIG. 7 shows variations of the use of tuning stubs. Note that the tuning stubs can be used independently of loading bars. FIG. 7(a) shows a dipole antenna containing multiple tuning stubs. Further, the stubs can have different geometrical parameters, e.g. spacing 116, width 614, length 612, termination (620, 624), and material. For example, the stub 710 has a wider separation 116A and a shorter length 612A than the separation 116B and length 612B of stub 720. FIG. 7(b) shows tuning stubs on both arms (340A, 340B) of a dipole antenna 250. One or more of the stubs on each of the arms 340 can have different geometrical parameters than those on the other arm 340. The stubs can also be placed 720 on opposite sides of either of the arms 340.

Generally (see exception below), changing the position of a given tuning stub on the arm 340 of a dipole antenna or on a small loop antenna (a small fraction of a wavelength in length) has little effect on the impedance. However, placement of the stub along the length of a large loop antenna (e.g., more than one wavelength in length) does have an effect on the impedance because the magnitude and phase of the current changes along the antenna length. Again in these cases, the effect of adding the stub can be analyzed as the effect of adding a lumped impedance at that location.

Figure 8:
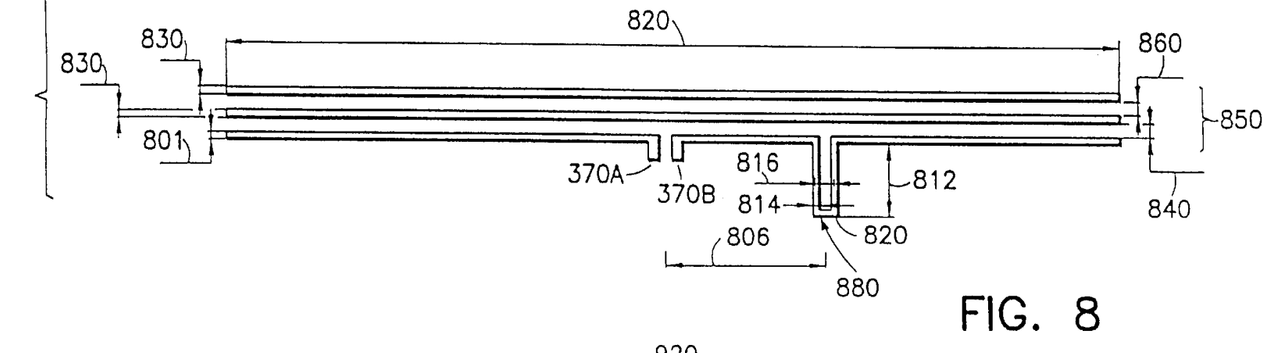
FIG. 8 is a diagram showing preferred dipole antenna with both loading bars and a stub structure.

FIG. 8 is a block diagram of one preferred embodiment of the antenna 250.

In this preferred embodiment, there are two 850 loading bars, each with a width 830 that is the same as the width 801 of the antenna. For 2.44 gigaHertz, this width 801 is chosen to be between 0.25 to 0.75 millimeters (mm), preferably about 0.5 mm. These numbers are chosen mainly for manufacturing convenience. The first loading bar is spaced from the antenna at a distance 840 that is equal to about 2 times the antenna width 801. The second loading bar is equally spaced at the same distance 860 from the first loading bar. The length 820 of the loading bars are chosen to be equal to that of the antenna mainly for manufacturing convenience. However, this configuration causes the antenna radiation pattern to be asymmetric. In alternative preferred embodiments, the lengths of the loading bars 820 are shortened to make the pattern more symmetric. Note that while reducing the length of the loading bars 820 affects both the antenna radiation pattern symmetry and Ra, the magnitude of the effect on symmetry is greater than that on Ra. For this embodiment, the loading bar length 820 can be between 70 and 100 percent of the antenna length (about 50 mm) without changing Ra significantly. Of course Ra can be "tuned" by changing the other geometrical parameters of the loading bars as described above. Other geometric parameters, e.g. the number of loading bars 850, also will affect the radiation pattern.

A single stub 880 is placed at a distance 806 from the antenna connection 870. This distance 806 has little effect on the antenna input impedance for most of the length of the antenna. However, the distance 806 is chosen so that the stub is not too close to the end of the arm of the dipole because placement at the end of the dipole would cause the stub to be at a current minimum. If the distance 806 is within 70 per cent of the antenna arm length the antenna impedance will not change significantly with respect to the position of a given stub 880. However, in the 30 per cent of the antenna arm length that is at the end of the dipole, there is a noticeable change in antenna impedance with respect to the position of a given stub 880 in this region. Therefore, in this embodiment, the stub 880 is located at a 806 within 70 per cent of the antenna length for ease of tuning the antenna.

In this embodiment, the single stub 880 has a line width 814 that is one half of the width of the antenna 801. The center-to-center spacing 816 is about the same as the antenna line width 801. The transmission line length 812 is about 10 percent of the antenna length (which is slightly less than ½ wavelength). The termination 820 is a short-circuit which causes the stub 880 to be inductive.

Figure 9:
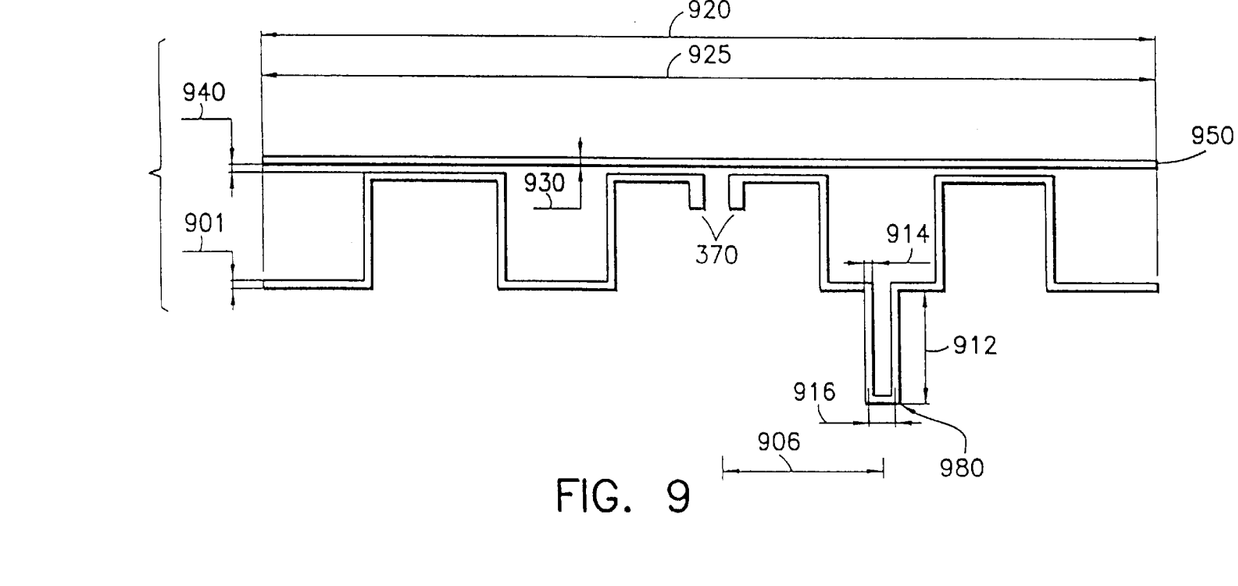
FIG. 9 is a diagram showing an alternative preferred meander dipole with a single loading bar and stub structure.

FIG. 9 is a diagram showing an alternative preferred embodiment of a meander dipole with a single loading bar and stub structure. Meander dipoles have arms that are not straight lines and are well known in the literature. By using a meander dipole, the length of the antenna (not numbered) can be placed in a smaller area. This embodiment uses a single 950 loading bar with a width 930 that is the same as the antenna line width 901. The loading bar is placed at a distance 940 from a given point on the antenna that is the same as the antenna line width 901. The length of the loading bar 920 is the same as the linear distance 925 spanned by the meander dipole.

A single stub 980 is located on one of the arms of the meander dipole at a distance 906 from the antenna terminal 370 that is within 70 percent of the linear distance 925 spanned by the meander dipole. The transmission line length 912 is chosen, as before, to be about 10 percent of the entire (meandered) antenna length. The stub width 914 is equal to the line width 901 of the antenna. The stub spacing 916 is equal to twice the line width 901 of the antenna. The termination is a short-circuit so that the stub appears as a lumped inductor. (Note that the stub is drawn as pointing downward.) However, the same effect can be achieved by a stub that is pointing up or by a stub that is placed horizontally at one of the vertical sections of the meander dipole.

Given this disclosure, equivalent embodiments of this invention would become apparent to one skilled in the art. These embodiments are also within the contemplation of the inventors.

We claim:

1. An antenna for use as a power source with a load having a complex impedance comprising:

a. an antenna section that has one or more elements and one or more antenna terminals, the antenna tuned to receive a radio frequency signal having a wavelength, an impedance across the antenna terminals having a real and a reactive part; and b. one or more loading bars, each loading bar having an effective length, the loading bar being within an antenna distance of at least one of the elements of the antenna over the effective length, the antenna distance being less than one quarter of the wavelength, and the loading bar reducing the real part of the impedance such that power delivered to the load by the antenna is increased.

2. An antenna, as in claim 1, where any one of the loading bars has any one or more of the following geometric parameters: a linear shape, a non linear shape, two or more parts that are not electrically connected, a varying bar width, a first placement on a first side of the antenna section, and a second placement on a second side of the antenna section.

3. An antenna, as in claim 2, where the bar length of one or more of the loading bars is equal to the antenna length of the antenna section within a tolerance.

4. An antenna, as in claim 2, where there is a bar spacing between any two of the loading bars and decreasing the bar spacing increases the amount that the real part of the impedance across the antenna terminals is suppressed.

5. An antenna, as in claim 4, where the bar spacing is less than 5 times an antenna width of the antenna section.

6. An antenna, as in claim 2, where the antenna section is any one of the following antenna types: a dipole, a monopole, a folded dipole, a loop, and a meander dipole.

7. An antenna as in claim 2, where the antenna section is a complementary aperture type antenna of any of the following antenna types: a dipole, a monopole, a folded dipole, a loop, and a meander dipole.

8. An antenna, as in claim 1, where one or more of the loading bars surrounds the antenna.

9. An antenna, as in claim 1, where two or more of the loading bars are electrically connected.

10. An antenna, as in claim 1, where each of the loading bars has a bar width and increasing the bar width increases the amount that the real part of the impedance across the antenna terminals is suppressed.

11. An antenna, as in claim 10, where the bar width of one or more of the loading bars is less than 30 times an antenna width of the antenna section.

12. An antenna, as in claim 1, where the distance is less than 10% of the wavelength.

13. An antenna, as in claim 1, where the distance is less than 3% of the wavelength.

14. An antenna for use as a power source with a load having a complex impedance comprising:

a. an antenna section that has one or more elements and one or more antenna terminals, the antenna tuned to receive a radio frequency signal having a wavelength, an impedance across the antenna terminals having a real and a reactive part;

b. one or more loading bars, each loading bar having an effective length, the loading bar being within an antenna distance of at least one of the elements of the antenna over the effective length, the antenna distance being less than one quarter of the wavelength, and the loading bar reducing the real part of the impedance such that power delivered to the load by the antenna is increased; and c. one or more tuning stubs in one or more of the elements, each of the stubs being a transmission line with a guided wavelength related to the wavelength, and each of the stubs having two conductors each with a conductor width, a stub length, a stub spacing between the conductors, and a termination, each of the stubs contributing a reactance to the reactive part.

15. An antenna, as in claim 14, where one or more of the stub lengths is an odd multiple of one quarter of the guided wavelength, the termination is a short-circuit, and the stub contributes an inductance to the impedance.

16. An antenna, as in claim 14, where one or more of the stub lengths is an odd multiple of one quarter of the guided wavelength, the termination is an open-circuit, and the stub contributes a capacitance to the impedance.

17. An antenna, as in claim 14, where one or more of the stub lengths is an even multiple of one quarter of the guided wavelength, the termination is a short-circuit, and the stub contributes a capacitance to the impedance.

18. An antenna, as in claim 14, where one or more of the stub lengths is an even multiple of one quarter of the guided wavelength, the termination is an open-circuit, and the stub contributes an inductance to the impedance.

19. An antenna, as in claim 14, where increasing the stub length increases the reactance contributed to the reactive part of the impedance across the antenna terminals.

20. An antenna, as in claim 14, where increasing the ratio of the stub spacing to conductor width increases the reactance contributed to the reactive part of the impedance across the antenna terminals.

21. An antenna, as in claim 14, where one or more of the elements has an end, an element length being the distance from the antenna terminal to the end, and one or more of the stubs is located within 70% of the element length from the antenna terminal.

22. An antenna, as in claim 14, where the antenna section is any one of the following antenna types: a dipole, a monopole, a folded dipole, a loop, and a meander dipole.

23. An antenna as in claim 14, that is a complementary aperture type antenna of any of the following: a dipole, a monopole, a folded dipole, a loop, and a meander dipole.

24. An antenna, as in claim 14, where the stub length is equal to or less than one quarter of the guided wavelength.

25. An antenna for use as a power source with a load having a complex impedance comprising:

a. an antenna section means, that has one or more elements and two or more antenna terminals, for being tuned to receive a radio frequency signal having a wavelength, an impedance across the antenna terminals having a real and a reactive part; and b. one or more loading bars for reducing the real part of the impedance such that pover delivered to the load by the antenna is increased, each loading bar having an effective length, the loading bar being within an antenna distance to at least one of the elements of the antenna over the effective length, the antenna distance being less than one quarter of the wavelength.

26. A radio frequency tag having an antenna with one or more antenna terminals, for use as a power source with a front end having a complex impedance the antenna terminals electrically connected to a front end, and the front end electrically connected to a tag circuit, the antenna further comprising:

a. an antenna section that has one or more elements connected to terminals, the antenna tuned to receive a radio frequency signal having a wavelength, an impedance across the antenna terminals having a real and reactive part; and b. one or more loading bars, each loading bar having an effective length, the loading bar being within an antenna distance to at least one of the elements of the antenna over the effective length, the antenna distance being less than one quarter of the wavelength, and the loading bar reducing the real part of the impedance such that power delivered to the front end by the antenna is increased.

* * * * *